United States Patent [19]

Karklins et al.

[11] 4,185,721

[45] Jan. 29, 1980

[54] SPRINGLESS SEAL FOR SHOCK ABSORBER

[75] Inventors: Elgin J. Karklins, Kettering; Michael L. Oliver, Xenia, both of Ohio

[73] Assignee: General Motors Corporation, Detroit, Mich.

[21] Appl. No.: 893,045

[22] Filed: Apr. 3, 1978

[51] Int. Cl.² .................................................. F16F 9/36
[52] U.S. Cl. ....................................... 188/322; 92/168; 188/315; 277/3; 277/27; 277/215
[58] Field of Search ............. 188/269, 315, 322; 277/3, 27, 215; 267/64 R, 64 A, 64 B, 65 R; 92/168

[56] References Cited

U.S. PATENT DOCUMENTS

| | | | |
|---|---|---|---|
| 2,848,261 | 8/1958 | Schultze | 288/19 |
| 3,214,182 | 10/1965 | Herbruggen | 277/215 X |
| 3,528,301 | 9/1970 | Wasmer | 92/168 X |
| 3,621,952 | 11/1971 | Long, Jr. et al. | 188/322 |
| 3,798,744 | 3/1974 | Smith | 267/64 R X |

FOREIGN PATENT DOCUMENTS

| | | | |
|---|---|---|---|
| 665399 | 5/1929 | France | 267/64 R |
| 927458 | 5/1947 | France | 267/64 R |
| 824964 | 12/1959 | United Kingdom . | |

*Primary Examiner*—George E. A. Halvosa
*Attorney, Agent, or Firm*—Charles R. White

[57] ABSTRACT

This hydraulic shock absorber has a piston rod guide in the upper end of the pressure cylinder with a conical recess in which a toroidal piston rod seal of elastomer material is trapped under axial compression loads by a seal cover secured to the reservoir tube. The tapered wall of the recess acting on spaced and upwardly extending peripheral ribs of the seal causes the seal body to radially constrict inwardly so that inner annular sealing lips thereof sealingly engage the piston rod of the shock absorber. Oil pressure in pockets formed between the peripheral ribs also exerts a force to constrict the seal for improved sealing.

4 Claims, 3 Drawing Figures

SPRINGLESS SEAL FOR SHOCK ABSORBER

This invention relates to hydraulic shock absorbers and more particularly to a new and improved springless seal for encircling and sealing the piston rod of a shock absorber to prevent loss of fluid from the shock absorber.

It is a common practice in shock absorbers of the direct acting type having a rod extending from one end of the shock absorber to place a toroidal and resilient seal element of a suitable elastomer around the rod at the point of its entry of the rod into the shock absorber. This resilient seal element is generally trapped in a recess in the rod guide by an upper seal cover and is retained under compression by a helical compression spring that is normally disposed between a washer-like metal retainer for the resilient seal element and the rod guide. The compression spring biases the seal element against the seal cover and places sufficient pressure on the resilient seal element to hold it in frictional engagement with the outer periphery of the piston rod to prevent loss of hydraulic fluid from the shock absorber.

While the prior shock absorber constructions have generally performed well, their constructions are generally complex and require numerous parts to provide effective piston rod sealing. Accordingly, it is a feature, object and advantage of this invention to provide a new and improved shock absorber piston rod seal which eliminates the prior art seal springs and which utilizes a minimal number of components and effectively makes use of the piston rod guide construction for biasing the seal radially inwardly into peripheral fluid sealing contact with a piston rod.

It is another object, feature and advantage of this invention to provide a new and improved piston rod seal having a resilient seal element in the form of a resilient elastomer torus forced by the conical wall of the seal cavity so that interior sealing lips engage the piston rod that passes through the center of the torus.

It is another feature, object and advantage of this invention to provide a new and improved fluid seal construction for a hydraulic shock absorber in which a toroidal seal element is provided with outer peripheral ribs compressively engaged by the conical wall of a recess in the piston rod guide that effects the radial constriction of the body of the seal element to bias inner sealing lips into annular fluid sealing engagement with the piston rod mounted for reciprocal sliding movement in the shock absorber.

It is another object, feature and advantage of this invention to provide a new and improved seal member in accordance with the foregoing objects wherein the compression forces on the sealing lips can be effectively increased or decreased by accordingly increasing or decreasing the amount of axial pressure securing the seal in a tapered seal cavity within the piston rod guide.

Further objects, features and advantages of the present invention will be apparent from the following description, reference being had to the accompanying drawings wherein a preferred form of the invention is clearly shown.

Figure 1:
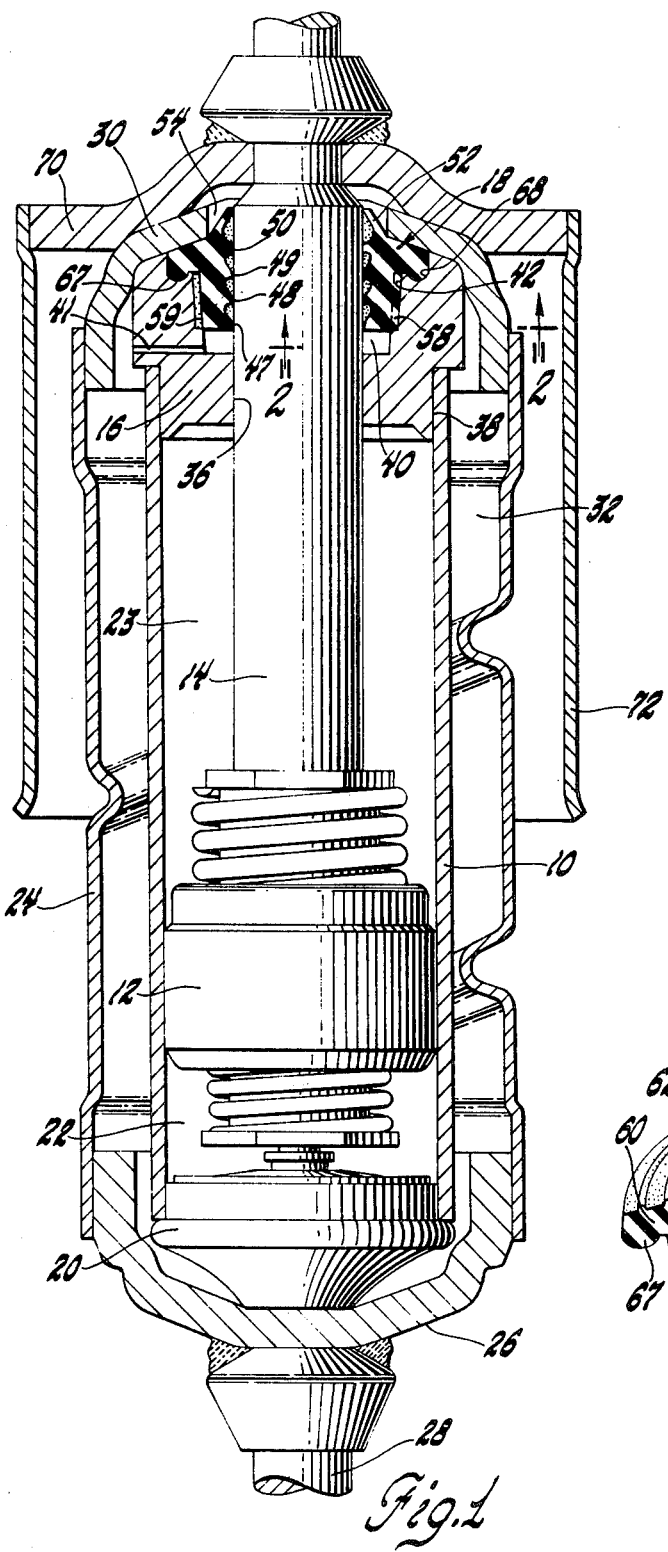
FIG. 1 is a vertical cross-sectional view with certain parts shown in elevation of a shock absorber incorporating the rod seal of this invention.

The shock absorber illustrated in FIG. 1 is of the direct acting type that includes an inner working cylinder 10 in which a piston 12 is disposed for sliding reciprocating movement. The piston 12 is carried on the lower end of a cylindrical operating rod 14 that projects upwardly from the shock absorber and is adapted for connection to vehicle structure such as the sprung mass of a motor vehicle.

The cylinder 10 has an upper end closed by a cylindrical piston rod guide 16 and a cooperating rod seal 18 of resilient elastomer or other suitable resilient material while the opposite end is closed by a base valve structure 20 that provides for the flow of hydraulic fluid to and from the compression chamber 22 formed in cylinder 10 between the piston 12 and base valve 20. The chamber 23 formed in cylinder 10 above the piston 12 is a rebound control chamber hydraulically connected to chamber 22 by the valving in piston 12.

The cylinder 10 is encircled by a cylindrical reservoir tube 24 that is secured to a cup-like closure member 26 at the base valve end of cylinder 10. This closure member is adapted to be secured to an unsprung mass of the vehicle by lower mounting structure 28. The opposite end of the tube 24 is secured to a cup-like seal cover 30 disposed at the rod seal end of the shock absorber. The chamber 32 between the cylinder 10 and the reservoir tube 24 forms a reservoir for the hydraulic fluid of this shock absorber. The reservoir tube is connected at its upper and lower ends to seal cover 30 and to closure member 26 respectively. The piston 12 of the shock absorber is provided with conventional valve mechanisms to provide for the controlled hydraulic flow of fluid between chambers 22 and 23 through the piston upon reciprocation of the piston in cylinder 10 to dissipate mechanical energy and dampen the spring action between the sprung and unsprung masses of the vehicle.

The operation of the valves within the piston and the base valve mechanism are conventional and well known, and further description of these valves is not necessary. The piston rod 14 passes through a central rod opening 36 formed in rod guide 16 and is thereby supported for axial reciprocating movement by the rod guide. The rod guide 16 is secured to the upper end of the cylinder 10 by the shouldered reduced diameter portion 38 that fits into cylinder 10. The upper end of rod guide 16 is formed with a radially enlarged and open ended seal chamber or recess 40 formed in part by conical or tapered wall 42 that is adapted to receive the elastomeric piston rod seal 18 described below. The seal cover 30, secured to the upper end of the reservoir tube 24, forms an end wall of the seal chamber 40. The seal 18 is trapped and compressively loaded axially by the seal cover 30 to provide an effective fluid closure for the upper end of the shock absorber. Passage 41 formed in the rod guide provides for the hydraulic communication between chamber 40 and the reservoir 32 so that fluid entering seal chamber 40 through rod opening 36 on rebound can feed into the reservoir.

Figure 3:
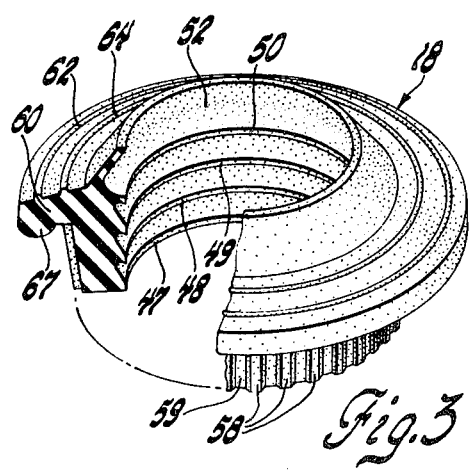
FIG. 3 is a perspective view of a portion of the rod seal of this invention.

As best seen in FIGS. 1 and 3, the seal 18 is a toroidal elastomeric element having a central aperture adapted to slidably receive the piston rod 14 and is preferably formed with a plurality of annular, internal sealing lips 47, 48, 49 and 50 which extend radially inwardly into peripheral and fluid sealing contact with the piston rod. In addition to the sealing lips 47 through 50, the seal 18 has an upper annular scraper lip 52 which extends into contact with piston rod 14 to prevent dirt and other foreign matter from deflecting the seal and packing between the seal cover and seal. This scraper lip construction also protects the piston rod in that it prevents the rod from contacting the walls forming the opening 54 in the cover for the piston rod to thereby prevent mechanical damage to the finish of the piston rod 14.

Figure 2:
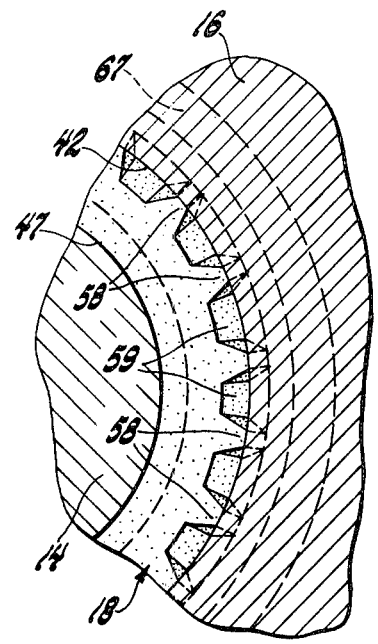
FIG. 2 is a sectional view taken generally along lines 2—2 of FIG. 1.

As best shown in FIGS. 2 and 3, the seal 18 is provided with a plurality of upwardly extending and equally spaced ribs or flutes 58 projecting radially outwardly from the lower portion of the seal. Under certain conditions of piston operation, chamber 40 receives oil from chamber 23 through the clearance established between rod 14 and opening 36 at a greater rate than is allowed to escape through passage 41 thereby creating a pressure in the chamber so that the lower portion of the seal including lips 47, 48, 49 are dynamically forced by oil pressure in cavities 59 between ribs 58 into sealing engagement with rod 14. More importantly, the ribs 58 are engaged and deflected inwardly by the conical wall 42 of the recess 40 when the seal is trapped and compressively loaded in its operative position by the seal cover 30. Under such conditions, the sealing lips 47, 48 and 49 are biased radially inwardly into closer sealing engagement with the piston rod 14. As shown, the upper portion of seal 18 is provided with an annular flange 60 with a pair of concentric upper sealing beads 62, 64 engaged by the seal cover for improved sealing of the upper end of the shock absorber 40. The enlarged annular bead 67 of the underside of flange 60 tightly fits in a corresponding channel 68 in the rod guide to prevent leakage of fluid between the rod guide and seal. The axial force on the seal element 18 exerted by cover 30 can be adjusted by adjusting the axial position of the seal cover 30 and its connection with reservoir tube 24. In this invention the ribs 58 can be changed in size, quantity and location to optimize or otherwise tailor the sealing efficiency of seal 18. Furthermore, the material of seal 18 and taper of the walls of the recess 40 are selected to provide an interference fit with the ribs 58 and optimize sealing effectiveness with respect to the piston rod.

In the preferred construction, the piston rod is provided with a disc-like cover plate 70 which supports a conventional dust tube 72 disposed radially outwardly of and concentric with cylinder 10 and reservoir tube 24.

From the above it will be appreciated that this construction effectively eliminates the need for a seal spring and seal retainer. This saves cost and simplifies assembly. The seal provides the new and improved dirt scraper that acts to prevent rod to seal cover contact and prevents dirt packing between the seal cover and seal.

While the embodiment of the invention as herein disclosed constitutes a preferred form of the invention, it is to be understood that other embodiments might be adopted as may come within the scope of the claims which follow.

We claim:

1. A telescoping hydraulic shock absorber comprising a pressure cylinder having a hydraulic fluid therein, a piston mounted for reciprocating sliding movement in said pressure cylinder, a cylindrical piston rod operatively secured to said piston and extending outwardly from one end of said pressure cylinder, a piston rod guide secured in one end of said pressure cylinder and having a cylindrical opening therethrough coaxial with said pressure cylinder which receives and slidably supports said piston rod, said piston rod guide having a recess in one end thereof defined by a tapered wall coaxial with said cylindrical opening, piston rod seal means of elastomeric material operatively mounted in said recess, said piston rod seal means being conical with an inner wall providing a central opening therethrough for receiving said piston rod, said inner wall having inner annular inner lip means for direct sealing engagement with said piston rod and having a series of outer rib means disposed lengthwise along the outer wall thereof, said ribs being engageable with said tapered wall of said recess and constructed and arranged to constrict said seal means radially inwardly and thereby forces said lip means to sealingly engage the periphery of said piston rod to prevent the passage of fluid from said pressure cylinder to the exterior of said shock absorber through said recess.

2. A telescoping hydraulic shock absorber comprising a pressure cylinder having a hydraulic fluid therein, a piston mounted for reciprocating sliding movement in said pressure cylinder, a cylindrical piston rod operatively secured to said piston and extending outwardly from one end of said pressure cylinder, a piston rod guide secured in one end of said pressure cylinder and having a cylindrical opening therethrough coaxial with said pressure cylinder which receives and slidably supports said piston rod, said piston rod guide having an inwardly tapering recess in one end thereof coaxial with said cylindrical opening, toroidal piston rod seal means of elastomeric material operatively mounted in said recess, said piston rod seal means having an inner wall providing a central opening therethrough for receiving said piston rod, said inner wall having inner annular inner lip means for direct sealing engagement with said piston rod and having a series of circumferentially spaced outer rib means disposed lengthwise along the outer wall thereof, said ribs being engageable with wall of said recess and constructed and arranged to deflect said seal means radially inwardly and thereby cause said lip means to sealingly engage the periphery of said piston rod to prevent the passage of fluid from said pressure cylinder to the exterior of said shock absorber through said recess.

3. A telescoping hydraulic shock absorber comprising a pressure cylinder having a hydraulic fluid therein, a piston mounted for reciprocating sliding movement in said pressure cylinder, a cylindrical piston rod operatively secured to said piston and extending outwardly from one end of said pressure cylinder, a piston rod guide secured in one end of said pressure cylinder and having a cylindrical opening therethrough coaxial with said pressure cylinder which receives and slidably supports said piston rod, said piston rod guide having a recess in one end thereof defined by an inwardly tapered wall coaxial with said cylindrical opening, annular seal means of elastomeric material for engaging said piston rod to prevent fluid leakage from said shock absorber, a seal retainer forming one end of said shock absorber, said annular seal means having an inner wall forming a central opening for said piston rod, said inner wall having annular inner lip means for direct sealing engagement with said piston rod, said annular seal means having a series of outer rib means extending lengthwise along the outer wall of said seal and forming fluid receiving pockets therebetween, said ribs being engageable with the tapered wall of said recess and said pockets receiving hydraulic pressure fluid causing constriction of said seal means inwardly and causing said lips to sealingly engage the periphery of said piston rod to prevent the passage of fluid from said pressure cylinder to the exterior of said shock absorber, and said annular seal means having additional sealing lip means extending axially from one end of said shock absorber to serve as a scraper to prevent foreign material from entering said shock absorber and to sealingly engage said seal retainer to prevent the accumulation of foreign matter between said seal means and said seal retainer.

4. A telescoping hydraulic shock absorber comprising a pressure cylinder having a hydraulic fluid therein, a reservoir tube disposed around said pressure cylinder and forming a fluid reservoir therebetween, a piston mounted for reciprocating sliding movement in said pressure cylinder, a cylindrical piston rod operatively secured to said piston and extending outwardly from one end of said pressure cylinder, a piston rod guide secured in one end of said pressure cylinder and having a cylindrical opening therethrough coaxial with said pressure cylinder which receives and slidably supports said piston rod, said piston rod guide having a recess in one end thereof defined by an inwardly tapered wall coaxial with said cylindrical opening, a fluid passage in said piston rod guide communicating said recess with said fluid reservoir, resilient piston rod seal means of elastomeric material operatively mounted in said recess, said piston rod seal means having inner annular inner lip means for direct sealing engagement with said piston rod and having a series of outer fluid receiving pockets disposed along the outer wall thereof formed by circumferentially spaced rib means extending lengthwise along said outer wall, said ribs being engageable with said tapered wall of said recess, said pockets being chargeable with hydraulic pressure which constricts said seal means radially inwardly to thereby force said lip means to sealingly engage the periphery of said piston rod and prevent the passage of fluid from said pressure cylinder to the exterior of said shock absorber through said recess.

* * * * *